(12) United States Patent
Liao et al.

(10) Patent No.: US 11,148,756 B2
(45) Date of Patent: Oct. 19, 2021

(54) BICYCLE FRONT DERAILLEUR

(71) Applicant: TEKTRO TECHNOLOGY CORPORATION, Changhua County (TW)

(72) Inventors: Bo-Yi Liao, Changhua County (TW); Yu-Ming Huang, Changhua County (TW); Tzung Ye Wu, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 324 days.

(21) Appl. No.: 16/208,754

(22) Filed: Dec. 4, 2018

(65) Prior Publication Data

US 2020/0156737 A1    May 21, 2020

(30) Foreign Application Priority Data

Nov. 16, 2018    (TW) ................................. 107140749

(51) Int. Cl.
*B62M 9/136*    (2010.01)
*B62M 6/90*    (2010.01)
*B62M 9/132*    (2010.01)

(52) U.S. Cl.
CPC .............. *B62M 9/136* (2013.01); *B62M 6/90* (2013.01); *B62M 9/132* (2013.01)

(58) Field of Classification Search
CPC ...... B62M 9/132; B62M 25/08; B62M 8/122; B62M 2025/006; B62M 9/135

USPC ....................................................... 474/80, 82
See application file for complete search history.

(56) References Cited

U.S. PATENT DOCUMENTS

| | | | | |
|---|---|---|---|---|
| 5,213,548 A | * | 5/1993 | Colbert | B62M 25/08 280/238 |
| 5,577,969 A | * | 11/1996 | Watarai | B62M 9/122 474/78 |
| 6,244,415 B1 | * | 6/2001 | Fujii | B62M 25/00 192/217 |
| 6,979,009 B2 | * | 12/2005 | Ichida | B62M 9/132 280/238 |
| 7,341,532 B2 | * | 3/2008 | Ichida | B62M 9/132 474/70 |

(Continued)

*Primary Examiner* — Henry Y Liu
(74) *Attorney, Agent, or Firm* — Locke Lord LLP; Tim Tingkang Xia, Esq.

(57) ABSTRACT

The disclosure provides a bicycle front derailleur including a fixing component, a chain guiding component, a linkage assembly, a battery assembly, two terminals, a circuit board assembly and a driving module. Two opposite ends of the linkage assembly are respectively and pivotally disposed on the fixing component and the chain guiding component. The battery assembly includes a battery holder and a battery. The battery holder is disposed on the fixing component, and the battery holder has a battery slot. One terminal is disposed in the battery slot, and the battery is removably inserted into the battery slot and is electrically connected to the terminal. The circuit board assembly is disposed on the fixing component and electrically connected to the other terminal. The terminals are electrically connected to each other. The driving module is disposed on the fixing component and electrically connected to the circuit board assembly.

14 Claims, 9 Drawing Sheets

(56) References Cited

U.S. PATENT DOCUMENTS

| | | | | |
|---|---|---|---|---|
| 7,442,136 B2* | 10/2008 | Ichida | B62M 9/132 | 474/80 |
| 8,241,158 B2* | 8/2012 | Ishikawa | B62M 25/08 | 474/80 |
| 8,864,611 B2* | 10/2014 | Kuwayama | B62M 9/1344 | 474/80 |
| 8,888,620 B2* | 11/2014 | Emura | B62M 9/135 | 474/80 |
| 8,979,683 B2* | 3/2015 | Katsura | B62M 9/122 | 474/80 |
| 9,573,652 B2* | 2/2017 | Kuwayama | B62M 9/132 | |
| 9,676,444 B2* | 6/2017 | Shipman | B62M 9/122 | |
| 9,873,482 B2* | 1/2018 | Nishino | B62M 9/135 | |
| 10,053,189 B2* | 8/2018 | Pasqua | B62M 25/08 | |
| 10,370,060 B2* | 8/2019 | Komatsu | B62M 25/08 | |
| 10,894,574 B2* | 1/2021 | Brown | B62M 9/128 | |
| 2001/0046916 A1* | 11/2001 | Fujii | B62J 11/00 | 474/144 |
| 2002/0052258 A1* | 5/2002 | Meggiolan | B62J 99/00 | 474/70 |
| 2002/0190173 A1* | 12/2002 | Fujii | B62M 9/122 | 248/300 |
| 2006/0186631 A1* | 8/2006 | Ishikawa | B62M 25/08 | 280/260 |
| 2014/0087901 A1* | 3/2014 | Shipman | B62M 9/132 | 474/82 |
| 2014/0102237 A1* | 4/2014 | Jordan | B62J 99/00 | 74/473.12 |
| 2014/0114538 A1* | 4/2014 | Shipman | B62M 9/132 | 701/51 |
| 2016/0221640 A1* | 8/2016 | Watarai | B62M 25/08 | |
| 2016/0257269 A1* | 9/2016 | Watarai | B62M 25/08 | |
| 2017/0008465 A1* | 1/2017 | Kasai | B62M 25/08 | |
| 2017/0101155 A1* | 4/2017 | Tachibana | H04W 4/70 | |
| 2017/0101160 A1* | 4/2017 | Nishino | B62M 9/135 | |
| 2017/0101162 A1* | 4/2017 | Tachibana | B62M 25/08 | |
| 2017/0120983 A1* | 5/2017 | Komatsu | B62K 25/286 | |
| 2018/0001960 A1* | 1/2018 | Pasqua | B62M 9/132 | |
| 2018/0229803 A1* | 8/2018 | Wesling | B62J 43/20 | |
| 2018/0362106 A1* | 12/2018 | Miles | B60L 1/003 | |
| 2019/0300111 A1* | 10/2019 | Liao | B62M 9/122 | |
| 2019/0300112 A1* | 10/2019 | Liao | B62M 9/125 | |
| 2019/0300118 A1* | 10/2019 | Nishino | B62M 25/08 | |

* cited by examiner

BICYCLE FRONT DERAILLEUR

CROSS-REFERENCE TO RELATED APPLICATIONS

This non-provisional application claims priority under 35 U.S.C. § 119(a) on Patent Application No(s). 107140749 filed in Taiwan, R.O.C. on Nov. 16, 2018, the entire contents of which are hereby incorporated by reference.

TECHNICAL FIELD

The disclosure relates to a bicycle front derailleur, more particular a bicycle front derailleur having a battery which is detachable from a battery holder and a circuit board casing which is detachable from a fixing component.

BACKGROUND

In recent years, road bikes, mountain bikes and other types of bicycles are all popular in the market, and it motivates bicycle manufacturers to pay more attention on improving their products. Generally, a bicycle has front sprockets on an output shaft and rear sprockets on a rear wheel hub, and there is a chain wrapped around the front sprockets and the rear sprockets. When a rider pedals the bicycle to rotate the front sprockets, the front sprockets can drive the rear sprockets to rotate through the chain so as to move the bicycle. Moreover, the bicycle is usually provided with derailleurs to switch the position of the chain. In detail, there are a front derailleur and a rear derailleur; the front derailleur is configured to move the chain among the front sprockets, and a rear derailleur is configured to move the chain among the rear sprockets. By using the front derailleur and the rear derailleur to switch the position of the chain, the gear ratio between the front sprockets and the rear sprockets can be changed.

In order to precisely shift the chain, an electronic front derailleur is developed. The electronic front derailleur is controlled and moved via the cooperation of a circuit board and a motor, and a battery of the electronic front derailleur provides electricity to the circuit board and the motor. When the circuit board receives a shift signal, the circuit board signals the motor to move a four-link mechanism so as to cause a chain guiding component to change the position of the chain. However, in the conventional electronic derailleur, it is difficult to detach the battery and the circuit board.

SUMMARY OF THE INVENTION

One embodiment provides a bicycle front derailleur which is configured to be fixed to a bicycle frame. The bicycle front derailleur includes a fixing component, a chain guiding component, a linkage assembly, a battery assembly, a first terminal, a second terminal, a circuit board assembly and a driving module. The fixing component is configured to be fixed to the bicycle frame. Two opposite ends of the linkage assembly are respectively and pivotally disposed on the fixing component and the chain guiding component. The battery assembly includes a battery holder and a battery. The battery holder is disposed on the fixing component, and the battery holder has a battery slot. The first terminal is disposed in the battery slot, and the battery is removably inserted into the battery slot and is electrically connected to the first terminal. The second terminal is electrically connected to the first terminal. The circuit board assembly is disposed on the fixing component and electrically connected to the second terminal. The driving module is disposed on the fixing component and electrically connected to the circuit board assembly.

Another embodiment provides a bicycle front derailleur which is configured to be fixed to a bicycle frame. The bicycle front derailleur includes a fixing component, a chain guiding component, a linkage assembly, a driving module and a circuit board assembly. The fixing component is configured to be fixed to the bicycle frame. Two opposite ends of the linkage assembly are respectively and pivotally disposed on the fixing component and the chain guiding component. The driving module is disposed on the fixing component. The circuit board assembly includes a circuit board casing and a circuit board. The circuit board casing is detachably disposed on the fixing component, the circuit board is fixed to the circuit board casing, and the circuit board is detachably and electrically connected to the driving module.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
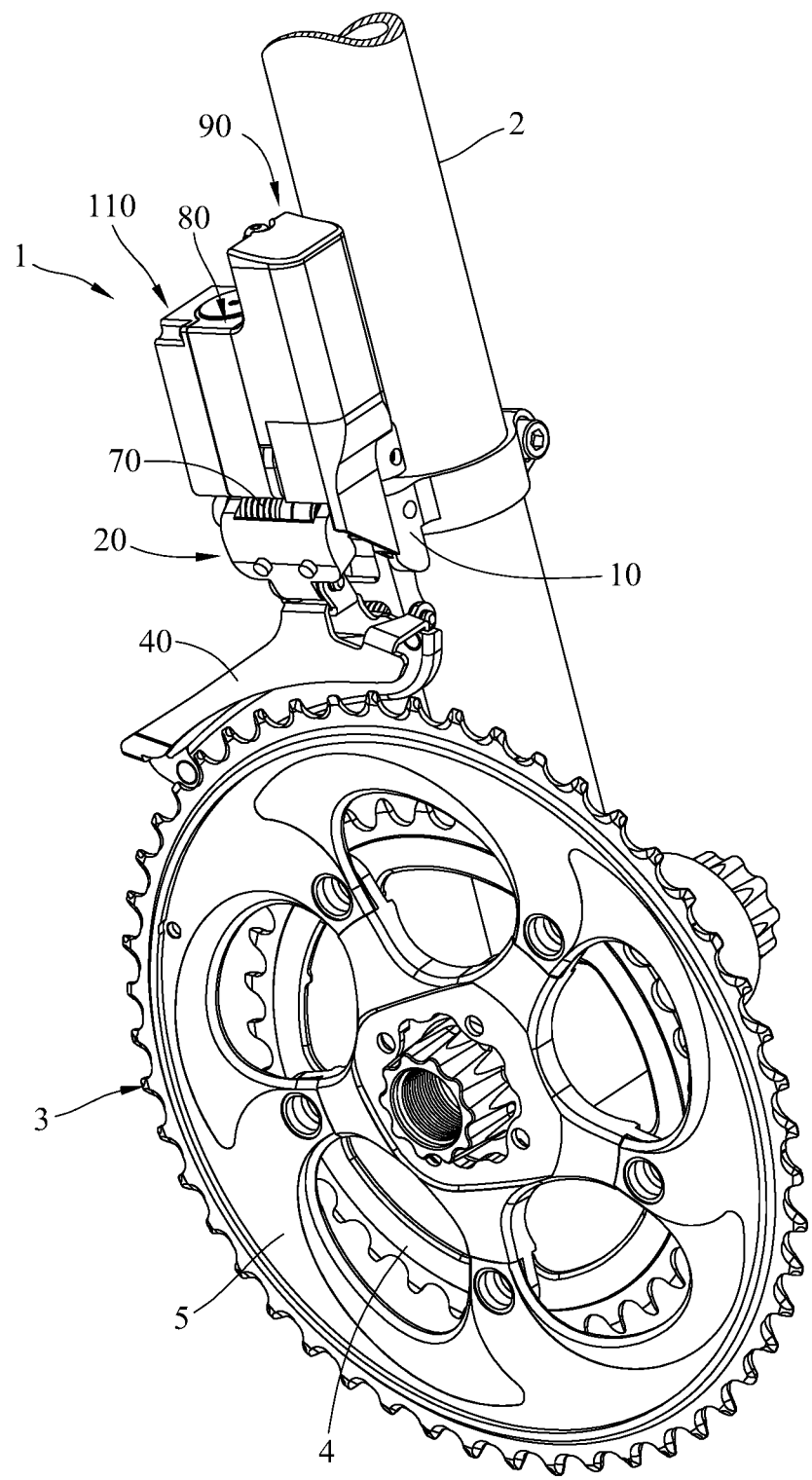
FIG. 1 is a perspective view of a bicycle front derailleur and a bicycle frame according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
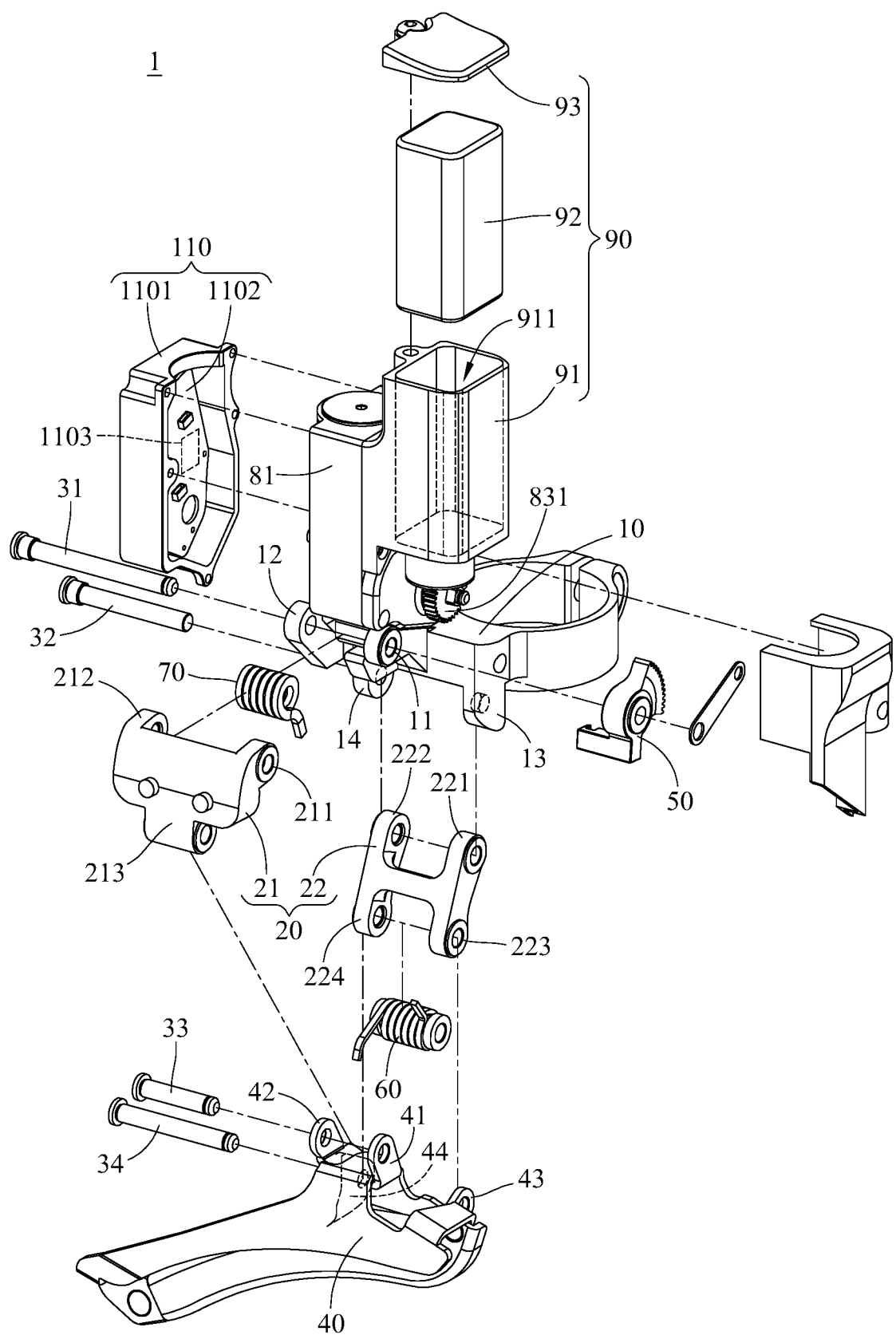
FIG. 2 is a partial exploded view of the bicycle front derailleur in FIG. 1.
Figure 3:
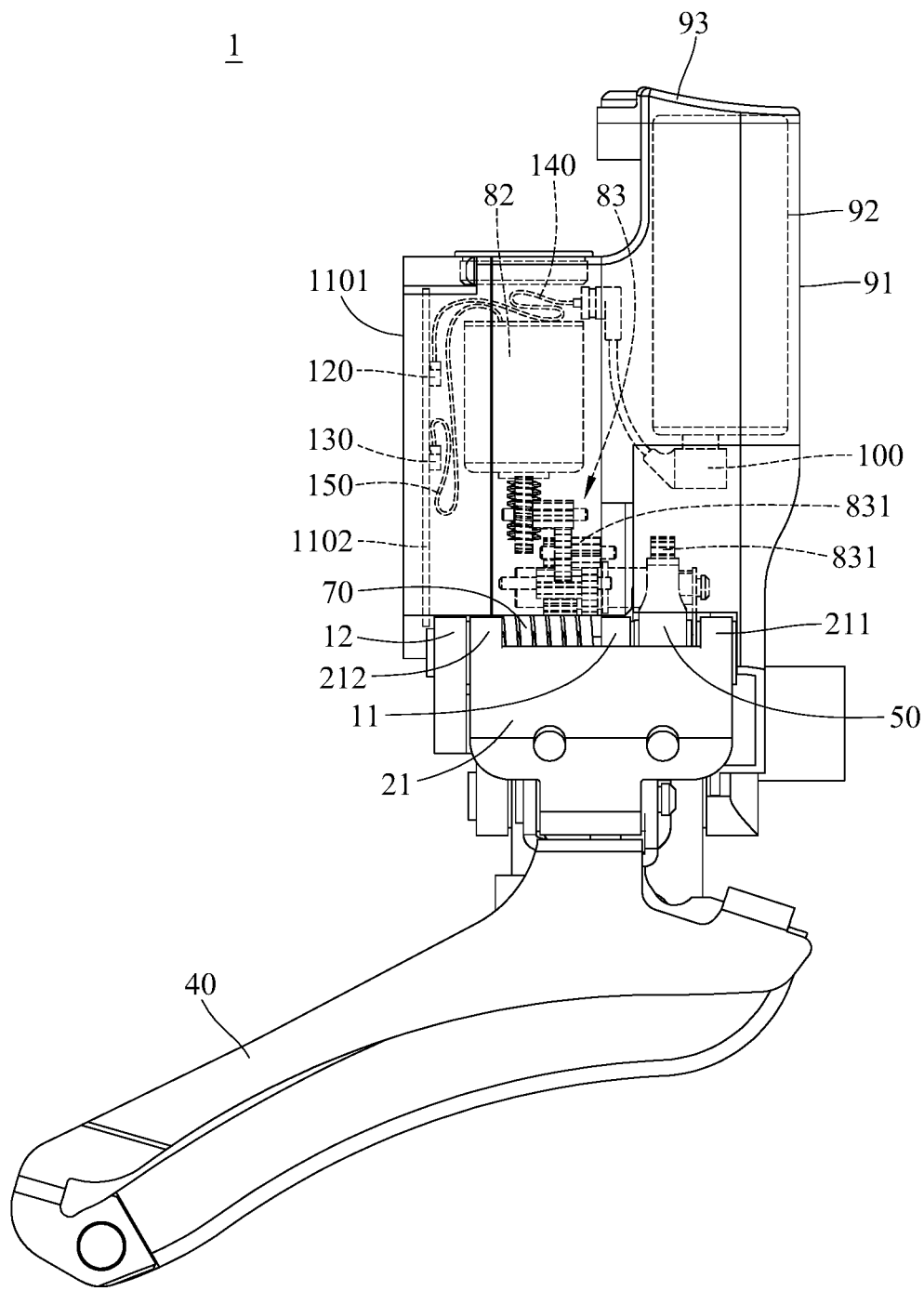
FIG. 3 is a front view of the bicycle front derailleur in FIG. 1.

Please refer to FIG. 1 to FIG. 3. FIG. 1 is a perspective view of a bicycle front derailleur and a bicycle frame according to a first embodiment of the disclosure. FIG. 2 is a partial exploded view of the bicycle front derailleur in FIG. 1. FIG. 3 is a front view of the bicycle front derailleur in FIG. 1

This embodiment provides a bicycle front derailleur 1 which is configured to be fixed to a bicycle frame 2. In order to illustrate the components of the bicycle front derailleur 1, relative positions of different sides of the bicycle front derailleur 1 in the bicycle are defined herein. The side of bicycle front derailleur 1 close to a brake/shift lever of the bicycle is the front side of the bicycle front derailleur 1, another side of the bicycle front derailleur 1 close to a rear wheel of the bicycle is the rear side of the bicycle front derailleur 1, and the other side of the bicycle front derailleur 1 away from a front cassette 3 of the bicycle is the upper side of the bicycle front derailleur 1.

The bicycle front derailleur 1 includes a fixing component 10, a linkage assembly 20, four pivots 31, 32, 33 and 34, a chain guiding component 40, a push component 50, a first elastic component 60 and a second elastic component 70.

The fixing component 10 is configured to be fixed to the bicycle frame 2. The fixing component 10 has two first pivot parts 11 and 12 and two second pivot parts 13 and 14. The linkage assembly 20 includes a first link 21 and a second link 22. The first link 21 has two third pivot parts 211 and 212 and a fourth pivot part 213. The two third pivot parts 211 and 212 are respectively and pivotally disposed on the two first pivot parts 11 and 12 via the pivot 31, and the two first pivot parts 11 and 12 and the two third pivot parts 211 and 212 are in a staggered arrangement. That is, the first pivot part 11 is located between the third pivot parts 211 and 212, and the third pivot part 212 is located between the first pivot parts 11 and 12. The second link 22 has two fifth pivot parts 221 and 222 and two sixth pivot parts 223 and 224. The fifth pivot parts 221 and 222 are respectively and pivotally disposed on the second pivot parts 13 and 14 via the pivot 32. The chain guiding component 40 has two seventh pivot parts 41 and 42 and two eighth pivot parts 43 and 44. The two seventh pivot parts 41 and 42 are respectively and pivotally disposed on two opposite ends of the fourth pivot part 213 of the first link 21 via the pivot 33, and the eighth pivot parts 43 and 44 are respectively and pivotally disposed on the sixth pivot parts 223 and 224 of the second link 22 via the pivot 34. The front cassette 3 includes more than one sprockets in difference size (e.g., sprockets 4 and 5 in FIG. 1). The chain guiding component 40 is configured to move a bicycle chain from the sprocket 4 to the sprocket 5 or from the sprocket 5 to the sprocket 4.

In this embodiment, the bicycle front derailleur 1 includes two second pivot parts (i.e., the second pivot parts 13 and 14), but the present disclosure is not limited thereto. In some other embodiments, the bicycle front derailleur may only include one second pivot part. Similarly, the quantities of the fifth pivot parts, the sixth pivot parts, the seventh pivot parts and the eighth pivot parts are not restricted either; in some other embodiments, the bicycle front derailleur only include one fifth pivot part, one sixth pivot part, one seventh pivot part and one eighth pivot part.

The push component 50 is sleeved on the pivot 31, and the push component 50 is in contact with the first link 21. The first pivot parts 11 and 12 are located on the same side of the push component 50, and a part of the push component 50 is located between the first pivot part 11 and the third pivot part 211. The first elastic component 60 is sleeved on the pivot 34 and located between the sixth pivot part 223 and the eighth pivot part 44. Two opposite ends of the first elastic component 60 are respectively in contact with the chain guiding component 40 and the second link 22, and the first elastic component 60 can provide elastic force to the chain guiding component 40 to move the chain guiding component 40 toward the bicycle frame 2. The second elastic component 70 is sleeved on the pivot 31 and located between the first pivot part 11 and the third pivot part 212, and two opposite ends of the second elastic component 70 are respectively in contact with the push component 50 and the first link 21. The second elastic component 70 can provide elastic force to the push component 50 so as to maintain the push component 50 to be in contact with the first link 21 when there is no external force applied on the push component 50.

The bicycle front derailleur 1 further includes a driving module 80, a battery assembly 90, a first terminal 100, a circuit board assembly 110, a second terminal 120, a third terminal 130, a first cable 140 and a second cable 150.

The driving module 80 includes a casing 81, a driving component 82 and a transmission assembly 83. The casing 81 is fixed to the fixing component 10. The driving component 82 is, for example, a motor, and the transmission assembly 83 is, for example, a gear assembly that includes a plurality of gears 831. The driving component 82 and a part of the gears 831 are disposed in the casing 81, and one of the gears 831 are located outside the casing 81. Each of the gears 831 is engaged with another adjacent gear 831, and the driving component 82 and the push component 50 are respectively connected to two of the gears 831.

The battery assembly 90 includes a battery holder 91, a battery 92 and a battery cap 93. The battery holder 91 is fixed on the casing 81 of the driving module 80 so as to be indirectly disposed on the fixing component 10. The battery holder 91 has a battery slot 911. The first terminal 100 is disposed in the battery slot 911. The battery 92 is removably inserted into the battery slot 911 and is surrounded by the battery holder 91, and the battery 92 is electrically connected to the first terminal 100. The battery cap 93 is detachably disposed on the battery holder 91, and the battery cap 93 and the battery holder 91 together cover the battery 92 so that the battery 92 is unexposed.

The circuit board assembly 110 includes a circuit board casing 1101 and a circuit board 1102. The circuit board 1102 is fixed on the circuit board casing 1101. The circuit board casing 1101 is detachably mounted on the casing 81 of the driving module 80 so as to be indirectly disposed on the fixing component 10, and the circuit board 1102 and the battery 92 are respectively located on two opposite sides of the casing 81. In other words, the battery 92 is located at the front sides of the bicycle front derailleur 1, and the circuit board 1102 is located at the rear side of the bicycle front derailleur 1. The second terminal 120 and the third terminal 130 are disposed on and electrically connected to the circuit board 1102. The first cable 140 is, for example, a flexible flat cable (i.e., FFC). The first cable 140 penetrates through the casing 81. One end of the first cable 140 is electrically connected to the first terminal 100, and the other end of the first cable 140 is detachably and electrically connected to the second terminal 120. The second cable 150 is, for example, a flexible flat cable. One end of the second cable 150 is electrically connected to the driving component 82, and the other end of the second cable 150 is detachably and electrically connected to the third terminal 130. The battery 92 is electrically connected to the driving component 82 via the first terminal 100, the first cable 140, the second terminal 120, the circuit board 1102, the third terminal 130 and the second cable 150 so as to provide electricity to the driving component 82.

In this embodiment, the electricity that the driving component 82 requires is not only provided by the battery 92 but also can provided by an external power that is electrically connected to the first terminal 100. For example, when the bicycle front derailleur 1 is mounted on an electric-powered bicycle, the external power that provides electricity to the electric-powered bicycle can be electrically connected to the first terminal 100 via a cable to provide electricity to the driving component 82.

In addition, the first terminal 100 is located at the front side of the bicycle front derailleur 1, which makes the cable easily connected to the first terminal 100 and the external power of the electric-powered bicycle when the external power of the electric-powered bicycle is located in front of the bicycle front derailleur 1.

Figure 4:
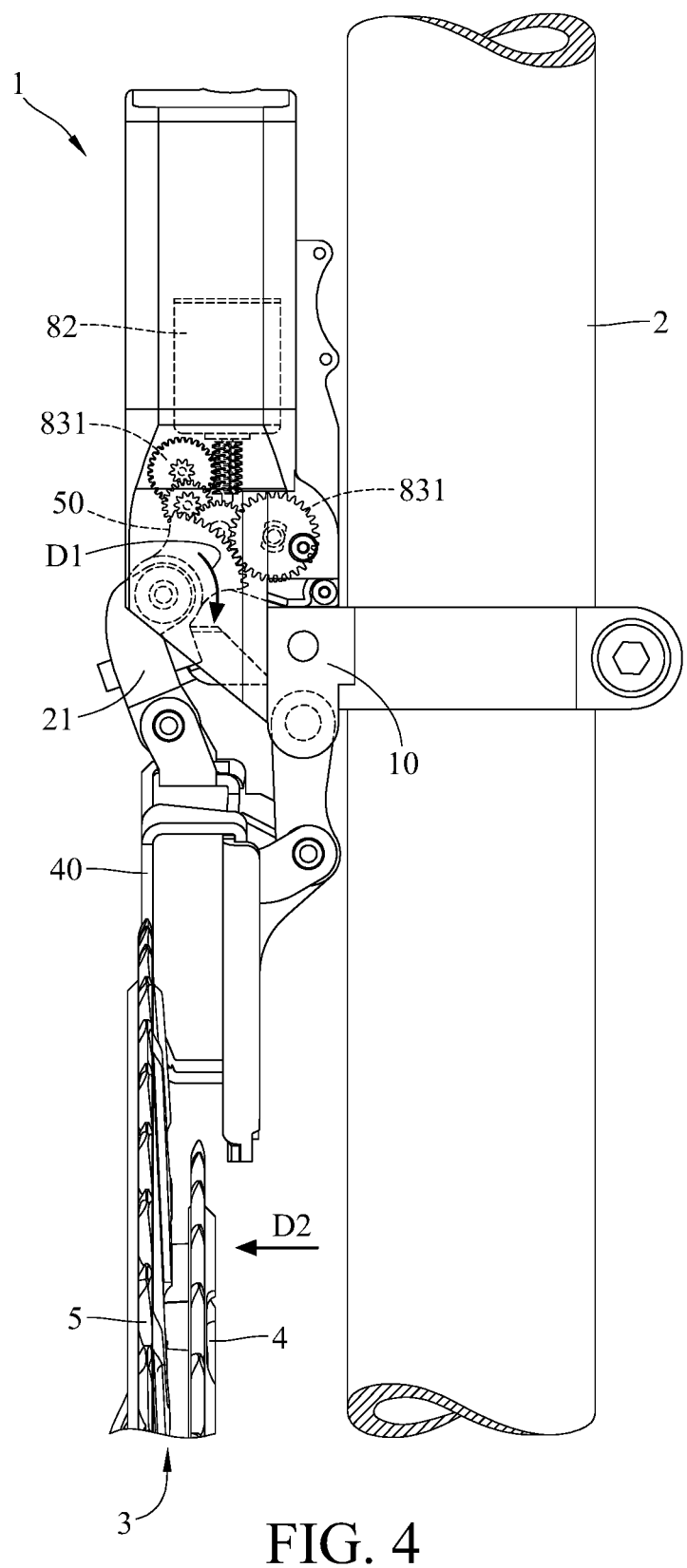
FIG. 4 is a lateral view of the bicycle front derailleur and the bicycle frame in FIG. 1.
Figure 5:
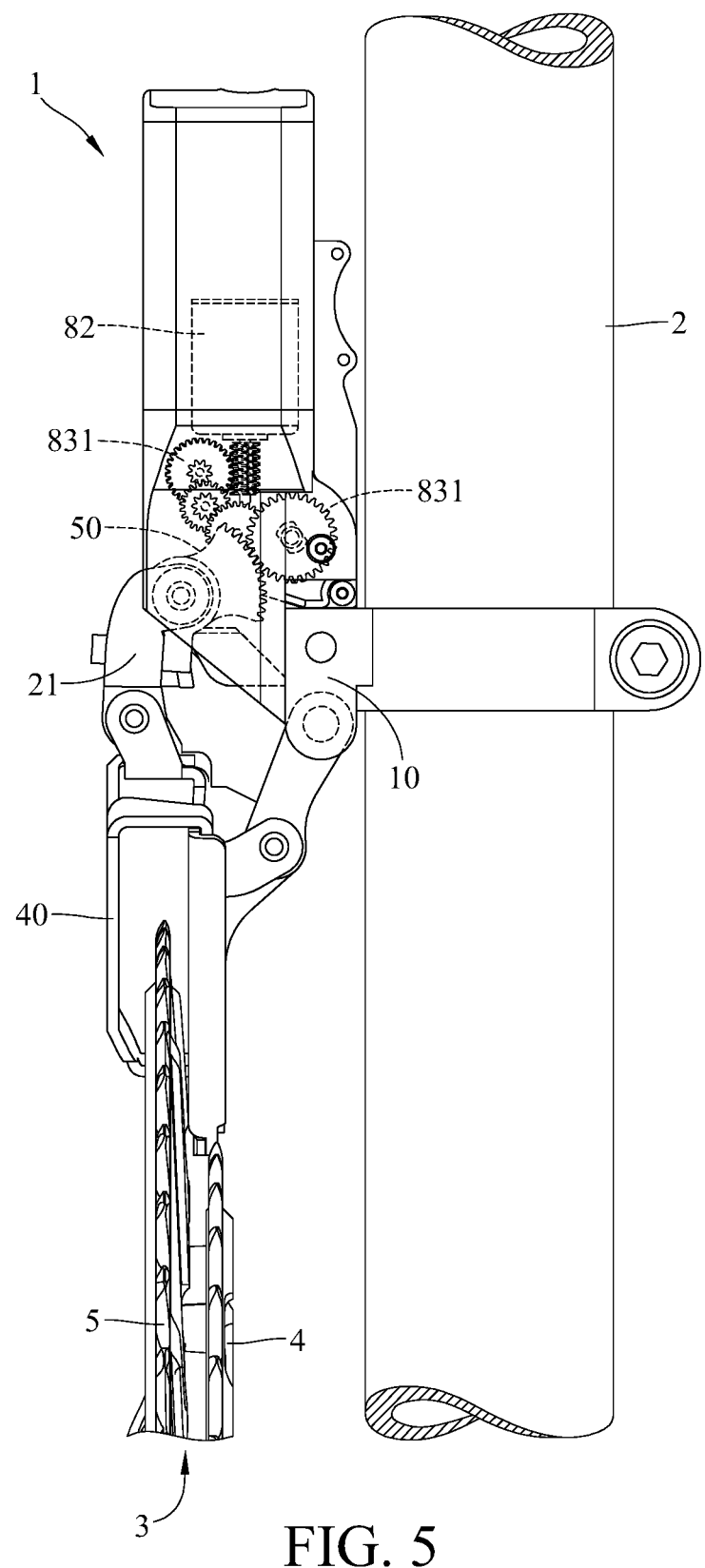
FIG. 5 is the lateral view of the bicycle front derailleur and the bicycle frame in FIG. 1 when a chain guiding component is moved.

In this embodiment, the circuit board 1102 has an antenna 1103. The antenna 1103 is configured to receive shift signals transmitted by the brake/shift lever. In detail, please refer to FIG. 2, FIG. 4 and FIG. 5. FIG. 4 is a lateral view of the bicycle front derailleur and the bicycle frame in FIG. 1. FIG. 5 is the lateral view of the bicycle front derailleur and the bicycle frame in FIG. 1 when a chain guiding component is moved.

Firstly, under a condition that the chain guiding component 40 corresponds to the sprocket 4 of the front cassette 3, when the antenna 1103 receives an upshift signal, the circuit board 1102 signals the driving component 82 to drive the gears 831 so as to rotate the push component 50 with respect to the fixing component 10 in a direction D1. At the same time, the rotated push component 50 pushes the first link 21 and forces it to pivot with respect to the fixing component 10 and move the chain guiding component 40 away from the bicycle frame 2 in a direction D2, such that the chain guiding component 40 is changed to the sprocket 5 of the front cassette 3, completing a shifting of the bicycle chain.

On the contrary, when the antenna 1103 receives a downshift signal, the circuit board 1102 signals the driving component 82 to drive the gears 831 so as to rotate the push component 50 in a direction opposite to the direction D1. At the same time, the rotated push component 50 gives some space for the first link 21 and allows the first link 21 to be moved toward the bicycle frame 2 so that the elastic force of the first elastic component 60 can cause the chain guiding component 40 to move in a direction opposite to the direction D2, thereby moving the bicycle chain from the sprocket 5 to the sprocket 4.

In this embodiment, the first pivot parts 11 and 12 of the fixing component 10 is located on the same side of the push component 50, such that the push component 50 can be detached from the pivot 31 when a part of components (not numbered) located between the first link 21 and the fixing component 10 are removed. As such, the configuration of the first pivot parts 11 and 12 of the fixing component 10 located on the same side of the push component 50 can decrease the complexity in detaching the push component 50 from the pivot 31.

In addition, the battery cap 93 can be detached from the battery holder 91 to change the battery 92, which makes it convenient in changing battery compared with the entire battery assembly being detached from the fixing assembly.

Moreover, the circuit board casing 1101 is detachable from the casing 81, which makes the circuit board 1102 detachable from the casing 81 with the circuit board casing 1101, thereby allowing maintainer to inspect the circuit board 1102.

Figure 6:
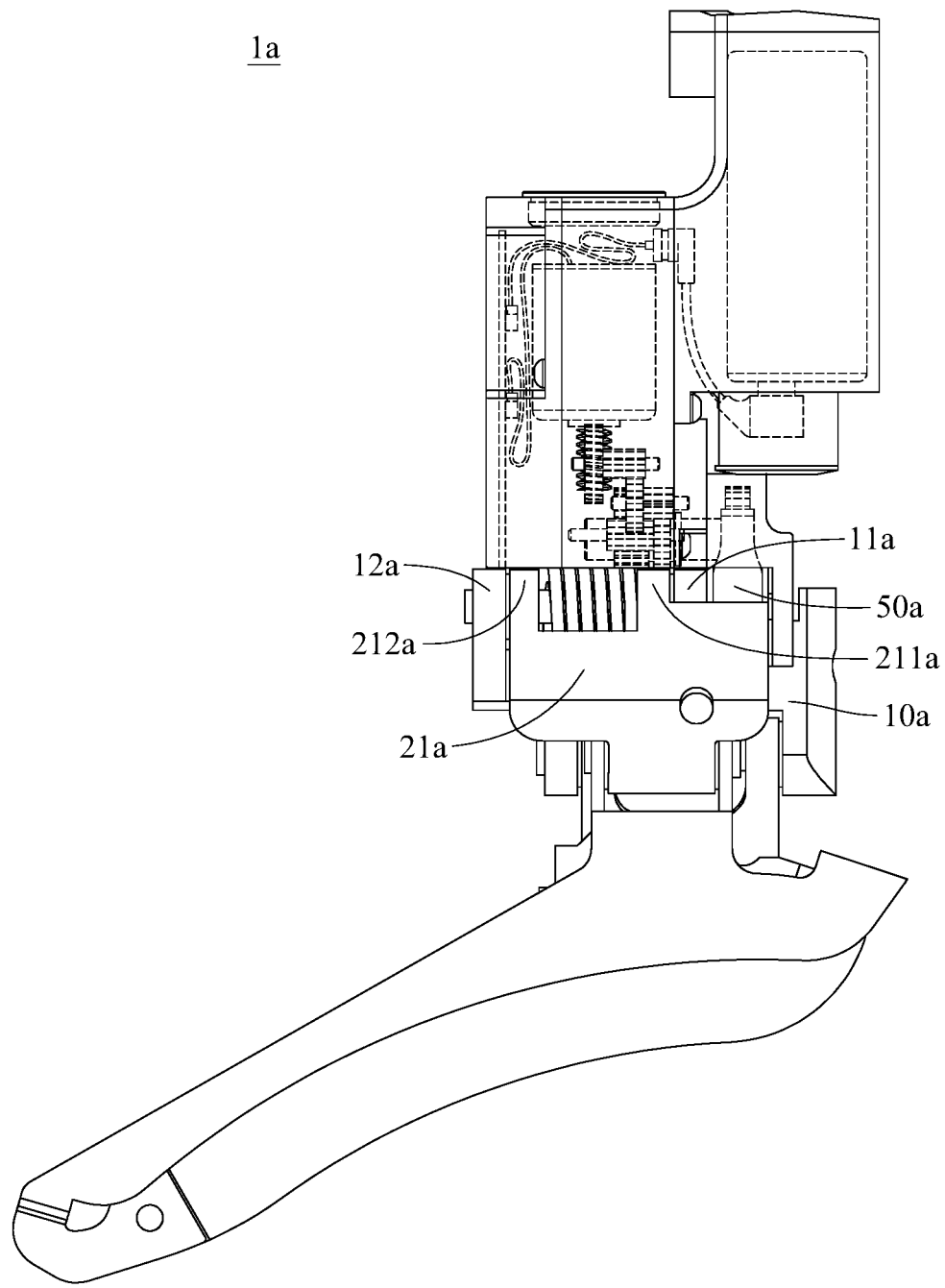
FIG. 6 is a front view of a bicycle front derailleur according to a second embodiment of the disclosure.

In addition, a part of the push component 50 is located between the first pivot part 11 and the third pivot part 211, but the present is not limited thereto. In some other embodiment, the push component may be located between the first pivot part 12 and the third pivot part 212. Moreover, please refer to FIG. 6. FIG. 6 is a front view of a bicycle front derailleur according to a second embodiment of the disclosure.

This embodiment provides a bicycle front derailleur 1a. The bicycle front derailleur 1a is similar to the bicycle front derailleur 1 shown in FIG. 1, thus only illustrating the difference between them in the following paragraphs.

In the bicycle front derailleur 1a, two third pivot parts 211a and 212a of a first link 21a is located between two first pivot parts 11a and 12a of a fixing component 10a, and the two third pivot parts 211a and 212a and the two first pivot parts 11a and 12a are located on the same side of a push component 50a.

Figure 7:
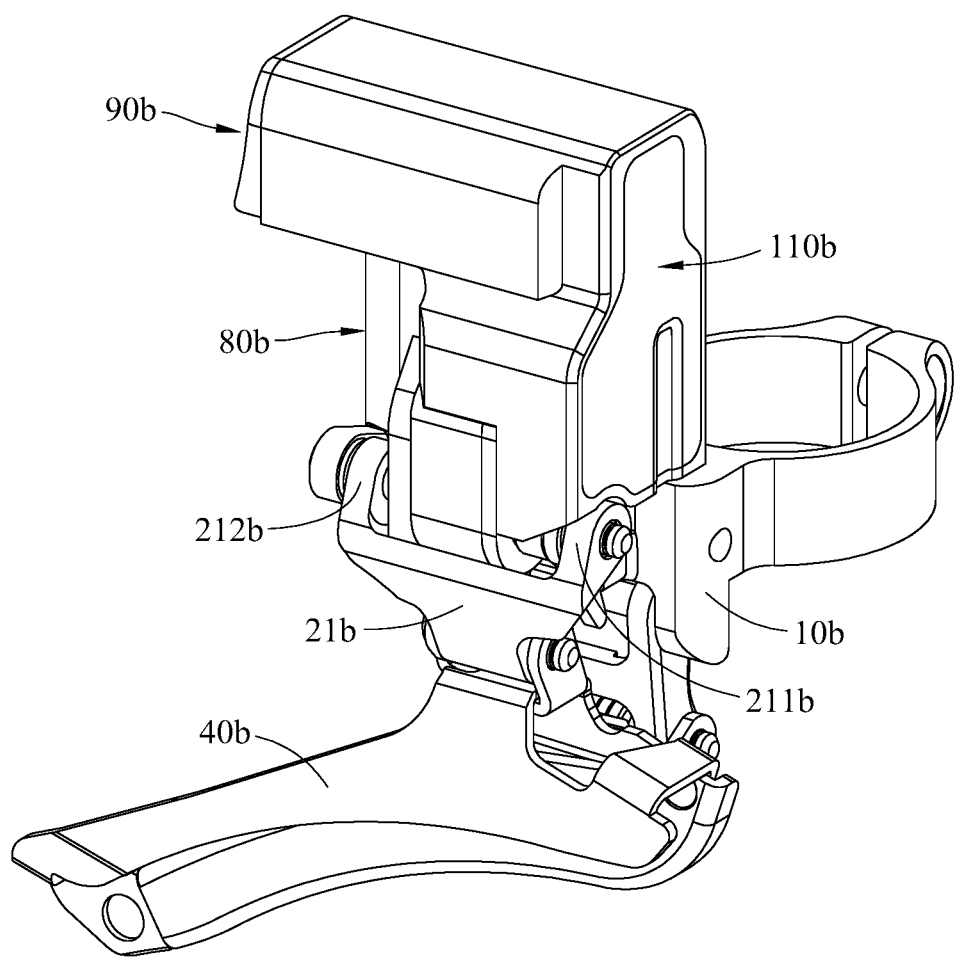
FIG. 7 is a perspective view of a bicycle front derailleur according to a third embodiment of the disclosure.
Figure 8:
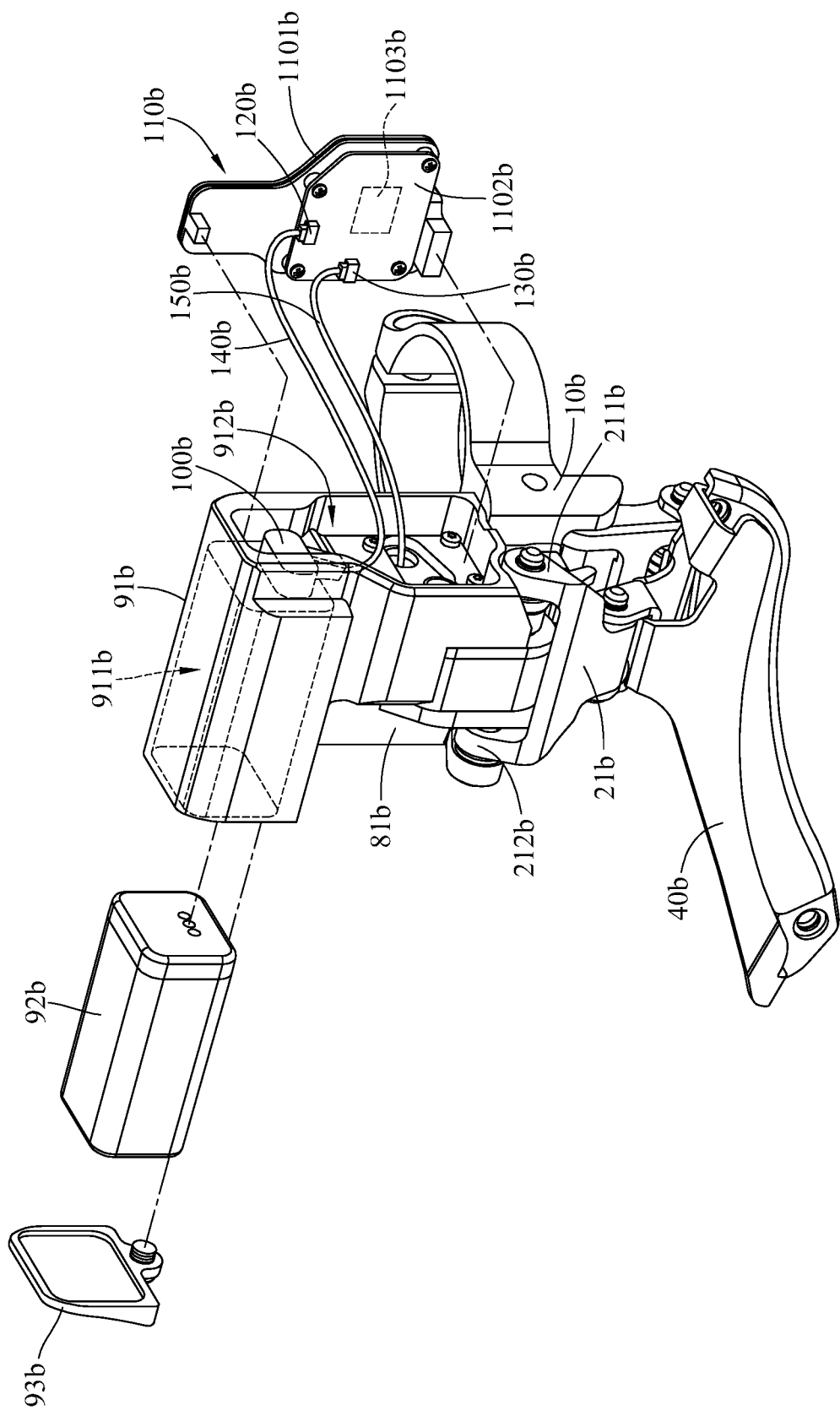
FIG. 8 is a partial exploded view of the bicycle front derailleur in FIG. 7.
Figure 9:
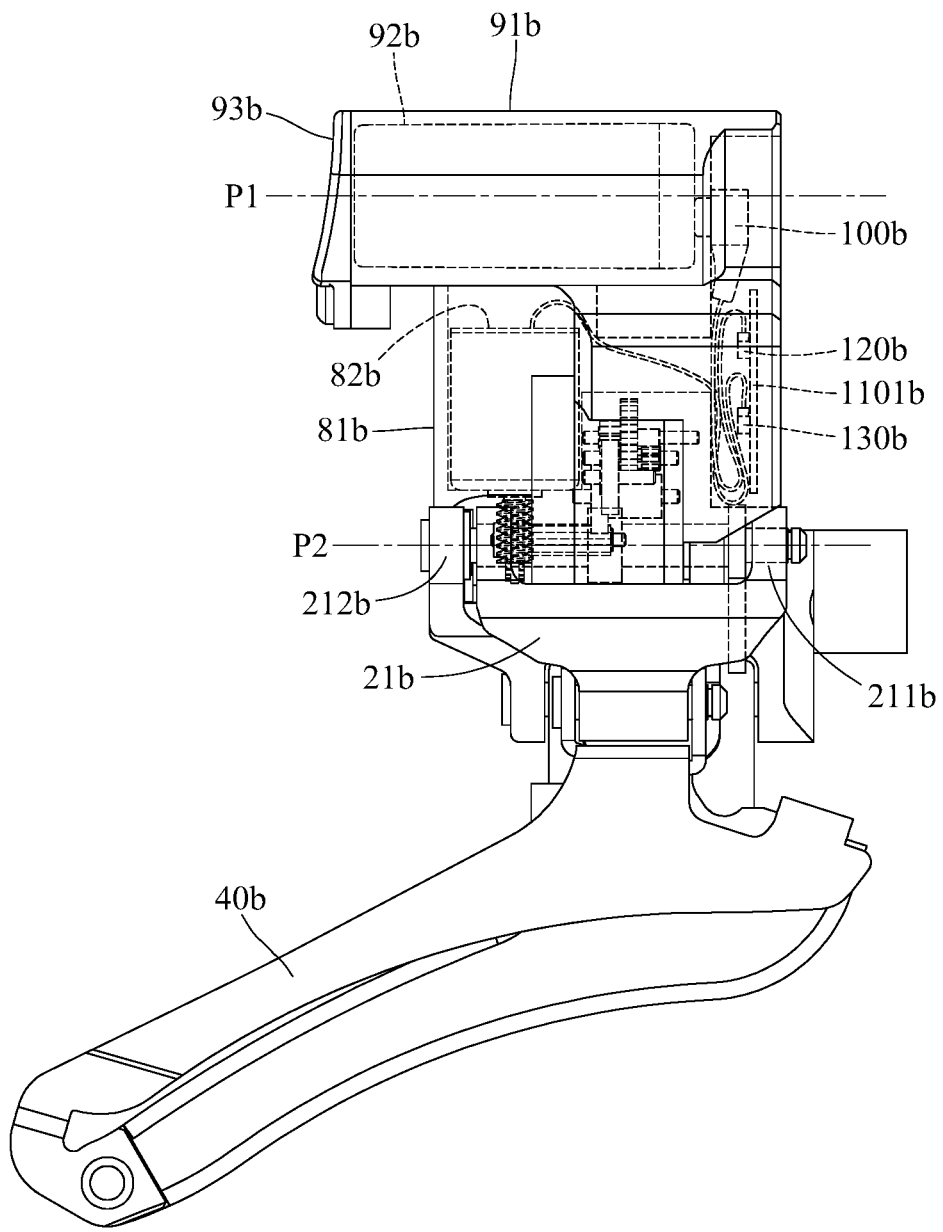
FIG. 9 is a front view of the bicycle front derailleur in FIG. 7.

In the aforementioned embodiments, the battery and the circuit board are located on two opposite sides of the casing of the driving module, but the present disclosure is not limited thereto. Please refer to FIG. 7 to FIG. 9. FIG. 7 is a perspective view of a bicycle front derailleur according to a third embodiment of the disclosure. FIG. 8 is a partial exploded view of the bicycle front derailleur in FIG. 7. FIG. 9 is a front view of the bicycle front derailleur in FIG. 7.

This embodiment provides a bicycle front derailleur 1b. The bicycle front derailleur 1b is similar to the bicycle front derailleur 1 shown in FIG. 1, thus only illustrating the difference between them in the following paragraphs.

In the bicycle front derailleur 1b, a battery holder 91b of a battery assembly 90b is fixed on a casing 81b of a driving module 80b so as to be indirectly disposed on a fixing component 10b. The battery holder 91b has a battery slot 911b and an accommodating space 912b that respectively face different directions and connected to each other. One part of a first terminal 100b is located in the battery slot 911b, and the other part of the first terminal 100b is located in the accommodating space 912b. A battery 92b is removably inserted into the battery slot 911b of the battery holder 91b and surrounded by the battery holder 91b, and a longitudinal axis P1 of the battery 92b is parallel to a rotation axis P2 of two third pivot parts 211b and 212b of a first link 21b. A battery cap 93b is detachably mounted on the battery holder 91b, and the battery cap 93b and the battery holder 91b together cover the battery 92b so that the battery 92b is unexposed.

A circuit board 1102b of a circuit board assembly 110b is fixed to a circuit board casing 1101b, and a second terminal 120b and a third terminal 130b are disposed on and electrically connected to the circuit board 1102b. The circuit board casing 1101b is detachably mounted on the battery holder 91b so as to be indirectly disposed on the fixing component 10b, and the circuit board 1102b is located in the accommodating space 912b. The second terminal 120b is detachably and electrically connected to the first terminal 100b via a first cable 140b, and the third terminal 130b is detachably and electrically connected to a driving component 82b of the driving module 80b via a second cable 150b which penetrates through the battery holder 91b and the casing 81b.

In this embodiment, the circuit board 1102b and the battery 92b are respectively located on two adjacent sides of the casing 81b, and the battery 92b is farther away from a chain guiding component 40b than the circuit board 1102b. In other words, the circuit board 1102b is located at the front side of the bicycle front derailleur 1b, and the battery 92b is located at the upper side of the bicycle front derailleur 1b.

In the view of the entire bicycle, when the bicycle front derailleur 1b is mounted on the bicycle frame 2, the circuit board 1102b is at the front sides of the bicycle front derailleur 1b, thus the circuit board 1102b is located close to the brake/shift lever of the bicycle, which shortens the distance between an antenna 1103b and the brake/shift lever, thereby enhancing the quality of the shift signals transmitted by the brake/shift lever.

In addition, the configuration of the longitudinal axis P1 of the battery 92b paralleling to the rotation axis P2 of the two third pivot parts 211b and 212b of the first link 21b can prevent the length of the bicycle front derailleur 1b from being increased due to the length of the battery 92b, thereby providing an aesthetic appearance of the bicycle front derailleur 1b.

In the aforementioned embodiments, the battery is replaceable, but the present disclosure is not limited. In some other embodiments, there may be a USB-type charging port disposed on the circuit board and exposed to outside, such that the battery can be charged via a USB-type cable. In such a case, the USB-type charging port, the second terminal and the third terminal are located on the same side of the circuit board, or the USB-type charging port and the two terminals are respectively located on two opposite sides of the circuit board.

According to the bicycle front derailleur as discussed above, the first pivot parts of the fixing component is located on the same side of the push component, such that the push component can be detached from the pivot when a part of components located between the first link and the fixing component are removed. This configuration decreases the complexity in detaching the push component from the pivot.

In addition, the battery cap can be detached from the battery holder for changing the battery, which makes it convenient in changing battery compared with the entire battery assembly being detached from the fixing assembly.

Moreover, the circuit board casing is detachable from the casing, which allows maintainer to inspect the circuit board when the circuit board casing is detached.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle front derailleur, configured to be fixed to a bicycle frame, comprising:
    a fixing component configured to be fixed to the bicycle frame;
    a chain guiding component;
    a linkage assembly, wherein two opposite ends of the linkage assembly are respectively and pivotally disposed on the fixing component and the chain guiding component;
    a battery assembly comprising a battery holder, a battery cap, and a battery, wherein the battery holder is disposed on the fixing component, the battery cap and the battery holder together cover the battery, and the battery holder has a battery slot;
    a first terminal disposed in the battery slot, wherein the battery is removably inserted into the battery slot and is electrically connected to the first terminal;
    a second terminal electrically connected to the first terminal;
    a circuit board assembly disposed on the fixing component and electrically connected to the second terminal; and
    a driving module disposed on the fixing component and electrically connected to the circuit board assembly.

2. The bicycle front derailleur according to claim 1, wherein the circuit board assembly comprises a circuit board casing and a circuit board, the circuit board is fixed to the circuit board casing, the circuit board casing is disposed on the fixing component, the battery and the circuit board are respectively located on different sides of the driving module, the battery is electrically connected to the circuit board, and the circuit board is electrically connected to the driving module.

3. The bicycle front derailleur according to claim 2, wherein the battery and the circuit board are respectively located on two opposite sides of the driving module.

4. The bicycle front derailleur according to claim 2, wherein the battery and the circuit board are respectively located on two adjacent sides of the driving module, and the battery is farther away from the chain guiding component than the circuit board.

5. The bicycle front derailleur according to claim 4, wherein a longitudinal axis of the battery is parallel to a rotation axis of the linkage assembly.

6. The bicycle front derailleur according to claim 2, wherein the circuit board casing is detachably disposed on the fixing component.

7. A bicycle front derailleur, configured to be fixed to a bicycle frame, comprising:
    a fixing component configured to be fixed to the bicycle frame;
    a chain guiding component;
    a linkage assembly, wherein two opposite ends of the linkage assembly are respectively and pivotally disposed on the fixing component and the chain guiding component;
    a driving module disposed on the fixing component;
    a circuit board assembly comprising a circuit board casing and a circuit board, wherein the circuit board casing is detachably disposed on the fixing component, the circuit board is fixed to the circuit board casing, and the circuit board is detachably and electrically connected to the driving module; and
    a battery assembly, comprising a battery holder, a battery cap, and a battery, wherein the battery holder is disposed on the fixing component, the battery holder has a battery slot, the battery is removably inserted into the battery slot, the battery cap and the battery holder together cover the battery, and the battery is electrically connected to the circuit board.

8. The bicycle front derailleur according to claim 7, wherein the battery and the circuit board are respectively located on different sides of the driving module, and the circuit board is electrically connected to the driving module.

9. The bicycle front derailleur according to claim 8, wherein the battery and the circuit board are respectively located on two opposite sides of the driving module.

10. The bicycle front derailleur according to claim 8, wherein the battery and the circuit board are respectively located two adjacent sides of the driving module, and the battery is farther away from the chain guiding assembly than the circuit board.

11. The bicycle front derailleur according to claim 10, wherein a longitudinal axis of the battery is parallel to a rotation axis of the linkage assembly.

12. The bicycle front derailleur according to claim 1, wherein the circuit board assembly comprises a circuit board, the circuit board and the battery are respectively located on two opposite sides of the of the driving module.

13. The bicycle front derailleur according to claim 1, wherein the circuit board assembly comprises a circuit board, the battery is located at a front side of the bicycle front derailleur, and the circuit board is located at a rear side of the bicycle front derailleur.

14. A bicycle front derailleur, configured to be fixed to a bicycle frame, comprising:

a fixing component configured to be fixed to the bicycle frame;

a chain guiding component;

a linkage assembly, wherein two opposite ends of the linkage assembly are respectively and pivotally disposed on the fixing component and the chain guiding component;

a battery assembly comprising a battery holder and a battery, wherein the battery holder is disposed on the fixing component, and the battery holder has a battery slot;

a circuit board assembly disposed on the fixing component, wherein the circuit board assembly comprises a circuit board, the battery is located at a front side of the bicycle front derailleur, and the circuit board is located at a rear side of the bicycle front derailleur; and a driving module disposed on the fixing component and electrically connected to the circuit board assembly.

* * * * *